A. H. WOUTERS.
DYNAMO ELECTRIC MACHINE.
APPLICATION FILED MAR. 1, 1907.

934,256.

Patented Sept. 14, 1909.
2 SHEETS—SHEET 1.

Witnesses
Oliver W. Harmon
Fred J. Kinsey

Inventor
Alfred H. Wouters
By
Chas. E. Lord
Attorney

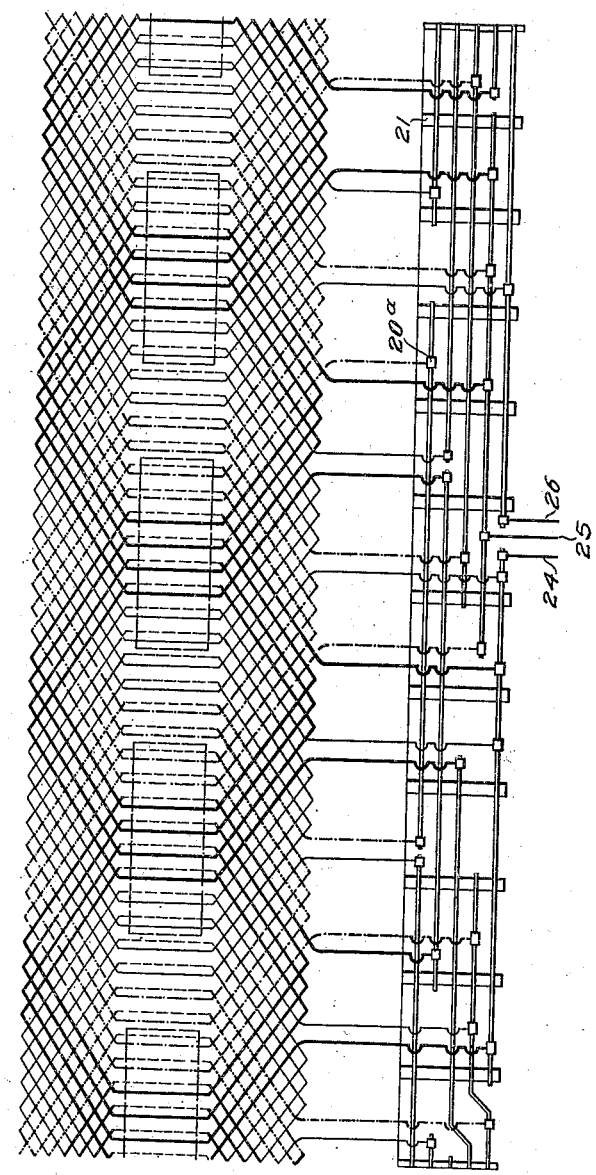

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

DYNAMO-ELECTRIC MACHINE.

934,256.     Specification of Letters Patent.     Patented Sept. 14, 1909.

Application filed March 1, 1907. Serial No. 359,953.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to stator windings of multipole, polyphase alternating current machines.

The object of my invention is to provide an improved and convenient construction and arrangement of the end connectors or connections for the coils of such windings, as the connections between the coils of different poles of each phase, the connections between the different phases and the different circuits of each phase in case multicircuit windings are employed, and also to the means for supporting such connectors or connections.

In carrying out my invention I provide connectors or connections consisting of a group of segmental or arc-shaped conductors, preferably of strap or bar copper, suitably insulated from one another and clamped to the end of the machine, and straps or clips connecting the arc-shaped conductors to the proper coils.

My invention consists further in certain novel details of construction and combinations and arrangements of parts which will be described in the specification and set forth in the appended claims.

For a better understanding of my invention, reference is had to the accompanying drawings in which—

Figure 1:
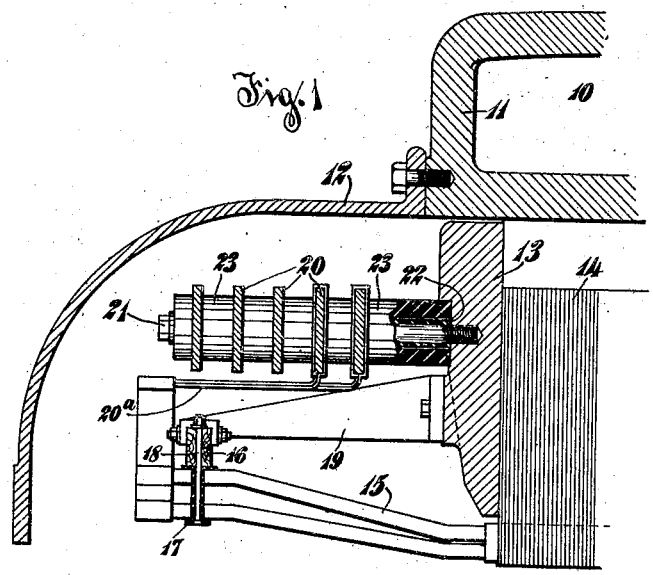
Figure 2:
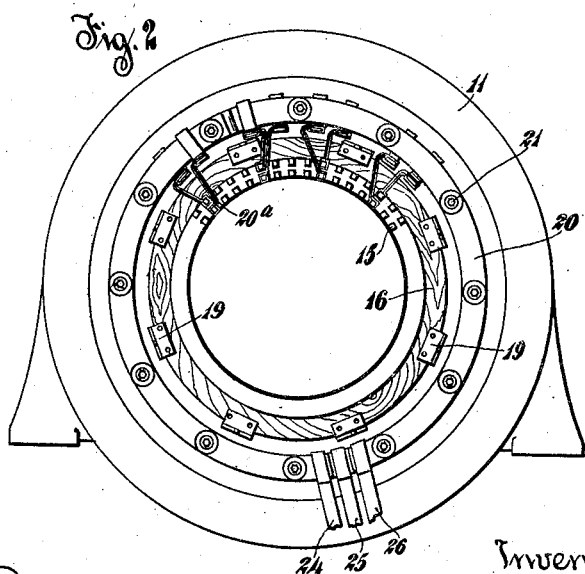

Figure 1 is an enlarged detail sectional view showing a portion of the stator of a dynamo-electric machine equipped with my invention. Fig. 2 is an end view of a stator equipped with my invention, parts of the machine being removed and portions of the stator coils and connections being omitted, and Fig. 3 is a development of a three-phase, two-circuit, four-pole, delta-connected stator winding, with its end-connectors arranged in accordance with my invention.

Referring now to the figures of the drawings, I have shown at 10 a portion of a stator frame including the yoke 11, an end shield or end bell 12, and an end plate 13, and at 14 a portion of the laminated stator core. The core is slotted in the usual manner and is provided with a stator winding 15, portions of the coils of which are shown in Figs. 1 and 2. The portions of the coils which project beyond the end of the core are supported in this case by an outer insulating ring 16 and an inner insulating ring 17 clamped together by insulated bolts 18 passing through the rings and between the coils, and by brackets 19 bolted to the outer ring and to the end plate 13 of the frame. It is to be understood that the coils are supported in this manner at each end of the machine.

The end connectors or connections for the coils of the stator winding consist in this case of segmental or arc-shaped strap or bar conductors 20 and straps or clips 20ª connected to the arc-shaped conductors and to the ends of the coils. The arc-shaped conductors are arranged axially side by side in rows or circles between the end shields 12 and the brackets 19. They are carefully insulated from one another and from the machine and are tightly and firmly clamped to the frame of the machine. In this case they are clamped to the plate 13 by bolts 21 passing through the conductors. The bolts are surrounded by insulating sleeves 22 and the conductors are spaced apart and from the end-plate 13 by insulating washers 23 mounted on the insulating sleeve. In this instance I have shown a three-phase, two-circuit, four-pole, delta-connected stator winding, and the connectors or connections therefor. As is shown in Fig. 3, there are nine segmental or arc-shaped conductors spaced about the machine and arranged in five rows or circles. Each of the segmental or arc-shaped conductors is connected to two or more of the straps or clips leading to the coils or the terminals of the machine which are shown at 24, 25 and 26. In this figure are shown the proper number and location of the arc-shaped conductors and clips or straps for effecting the electrical connections to the terminals of the machine, between the coils of the different poles of each phase, between the different phases, and between the circuits of each phase.

It will be seen that the connectors or connections and the means for supporting the same are particularly adapted for stator windings for comparatively low voltage and high amperage, in which heavy connectors of large current-carrying capacity are required. It will also be seen that the various connections can be easily made and that all parts are firmly supported and insulated. It will be understood, however, that the same form of connectors or connections, the arrangement, and means for supporting the same, can be employed for different stator windings, for example, windings of a different number of circuits or of a different number of phases. I do not wish therefore, to be confined to the exact details shown but aim in my claims to cover all modifications which do not involve a departure from the spirit and scope of my invention.

What I claim as new is:—

1. In a dynamo-electric machine, a stator frame, a core, a stator winding comprising a plurality of coils, a plurality of connectors for certain of said coils comprising arc-shaped strap or bar conductors arranged side by side and clips or straps connected to said conductors and to the coils, insulating spacing members between said conductors, and means for holding said conductors in position comprising axial bolts each passing through a group of the strap or bar conductors and extending into the frame of the machine.

2. In a dynamo-electric machine, a stator frame, a core, a multiphase winding comprising a plurality of coils, connectors for certain of said coils comprising arc-shaped strap conductors arranged axially side by side and clips or straps connecting said conductors to said coils, insulating spacing members between said conductors, and means for clamping said conductors together and to the frame of the machine comprising insulated bolts passing through a group of the conductors and into said frame.

3. In a dynamo-electric machine, a stator core, a stator winding in said core, and arc-shaped straps or bars connecting different parts of said winding, said straps or bars being arranged circularly end to end and supported on the end of the stator core.

4. In a dynamo-electric machine, a stator core, a stator winding in said core, arc-shaped straps or bars connecting different parts of said winding, said straps or bars being arranged both axially side by side and circularly end to end, and means for fastening said straps or bars to the end of the stator core and insulating them from each other and said core.

5. In a dynamo-electric machine, a stator core, a multipole multiphase stator winding in said core, and a plurality of arc-shaped straps or bars connecting different parts of said winding, some of said straps or bars being arranged circularly end to end and some axially side by side, and insulated bolts each passing through a group of straps or bars which are arranged side by side and fastening them to the stator core.

6. In a dynamo-electric machine, a stator core, a multipole multiphase winding in said core, arc-shaped straps or bars connecting different parts of said windings, said straps or bars overlapping circumferentially and being arranged axially side by side, bolts each passing through a group of the straps or bars which are arranged side by side and into the stator core, and insulating spacing members surrounding the bolts and spacing the straps or bars from each other and from the stator core.

In testimony whereof I affix my signature, in the presence of two witnesses.

ALFRED H. WOUTERS.

Witnesses:
  GEO. B. SCHLEY,
  FRED J. KINSEY.